(12) United States Patent
Naganuma

(10) Patent No.: US 6,470,223 B1
(45) Date of Patent: Oct. 22, 2002

(54) GROUP OBJECT IN A CONTROL SYSTEM, AND A CONTROL SYSTEM USING THE SAME

(75) Inventor: Takefumi Naganuma, Kyoto (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 09/394,403

(22) Filed: Sep. 13, 1999

(30) Foreign Application Priority Data

Sep. 11, 1998 (JP) .......................................... 10-257707

(51) Int. Cl.⁷ .......................................... G05B 15/02
(52) U.S. Cl. .......................................... 700/9; 700/23
(58) Field of Search .......................... 700/2, 9, 10, 11, 700/169, 200, 82, 17, 83, 80, 79, 23

(56) References Cited

U.S. PATENT DOCUMENTS

| | | | | |
|---|---|---|---|---|
| 5,008,805 A | * | 4/1991 | Fiebig et al. | 700/82 |
| 5,086,385 A | * | 2/1992 | Launey et al. | 700/83 |
| 5,822,273 A | * | 10/1998 | Bary et al. | 340/825 |
| 6,151,023 A | * | 11/2000 | Chari | 345/349 |

\* cited by examiner

Primary Examiner—Maria N. Von Buhr
Assistant Examiner—Kidest Bahta
(74) Attorney, Agent, or Firm—Dickstein Shapiro Morin & Oshinsky LLP

(57) ABSTRACT

The object of this invention is to provide a cooperation control system to make the system maintenance easier, and allow easier modification of the system. To achieve such object, a plurality of control devices according to this invention are divided into a plurality of sub-groups each of which cooperates with each other. The group object controls the sub-group. The plurality of control devices within the sub-group communicate with the group object and they are controlled by the group object.

7 Claims, 18 Drawing Sheets

GROUP OBJECT IN A CONTROL SYSTEM, AND A CONTROL SYSTEM USING THE SAME

FIELD OF INVENTION

This invention concerns a group object in a control network system, and a control system and a control unit using such a group object.

BACKGROUND OF THE INVENTION

There is often a necessity in the market where a plurality of devices (specially control devices) such as PLC are connected with each other to cooperate and conduct specific target jobs.

For example, a plurality of control devices 1a, 1b, 1c are connected with each other to the network which is built by the decentralized object technologies as shown in FIG. 1(a). In the first through fourth devices 1a–1d, a control object 3 is installed. The control object 3 consists of an object request broker (ORB) 2 which defines the interface specification between the programs, and the control object 3 which sends the messages to other control devices, and sends an operation command (control command) to the currently connected functional device with this control device in order to operate the functional device properly.

When a cooperation control such as a synchronous control, an exclusive control or a sequential control is carried out in a control system among a plurality of control devices 1a through 1d, a communication program must be installed in the control devices which communicate with the other control devices. The actual addresses of the other control devices lined together must be set up in such a communication program. For example, when the four control devices 1a–1d are linked together for the operational cooperation control, it is necessary for the first control device 1a to communicate with the other control devices 1b–1d by duplex communication which requires the actual addresses of these control devices.

By the above method, the control object 3 of the first device 1a can communicate with the control objects of the other control devices 1b–1d directly. This enables for control device 1a to know the current status of the other control devices, and it brings the actual operational cooperation control with each other.

After the control system is established, it often happens that some portion of the system must be modified. For example, such modification is needed when a control device in a system needs to be added or deleted. In such a case, we will experience the following problems.

Let's assume that we need to delete the fourth control device 1d from the network. After we modify the network, only control devices 1a–1c will cooperate with each other thereafter as shown in FIG. 1(b). The first control device 1a is currently installed with a duplex communication program to communicate with the fourth control device 1d, and the control object 3 of the first control device 1a receives the communication information from the fourth control device id to conduct the various controls to the devices connected to the first control device 1a.

It is, therefore, necessary for the control object 3 of the first control device 1a to modify their own communication programs and other control programs which are affected by the fourth control device 1d when the fourth control device 1d is deleted. This is also true in other control devices (in the figure, second and third control devices). If adding a new control device to the system, the modification of other control devices is needed as above. It is, thus, a problem in the maintenance of the system because the various programs must be modified which currently cooperate each other. This drives the maintenance cost upwards.

FIG. 4 shows the system cooperation control in which four control devices cooperate with each other. In the actual system, more control devices are used, so the problem mentioned above becomes more serious.

This invention is made in light of the problem mentioned above.

SUMMARY OF THE INVENTION

The object of this invention is to solve the problem, and to make the system maintenance easier, and allow easier modification of the system.

Another object of this invention is to provide the group object and control system, which achieve a real time cooperation control even when the network becomes large.

To achieve the object above, this control system according to claim 4 is a cooperation control system which allows controlling a plurality of control devices simultaneously, which are connected to a network. In this system, a plurality of control devices are divided into a plurality of sub-groups each of which cooperates with each other. The group object controls the sub-group. The plurality of control devices within the sub-group communicate with the group object and they are controlled by the group object.

A plurality of control devices within the same cooperation control are connected to the group object. This means that the group object functions as a managing device. In other words, each group object controls only the devices which are in cooperation control even when many control objects are connected to the network. This makes the load of the group object smaller, and the maintenance of the object group quicker in real time.

Since the individual control device sends a request or a message to the group object and it is controlled by the command of the group object which functions as a managing device, the individual control device does not need to know the status of the other control devices in the same group for the cooperation control in the system. When a new cooperation control group is added into the network after the system is established, it is not necessary to change the protocol and other system in the existing devices. This makes the system change quicker and easier.

The following is an actual configuration of this group object (managing device). A group object for synchronized control is used to control a plurality of control devices connected to a network. It comprises 1) a communication means to communicate with the control devices to be synchronized which are present among a plurality of other control devices, 2) a memory unit for event list to memorize the event request (in this embodiment, the Event-Wait-Message), and 3) a message generating means to generate a message of event permission to a control device which is requesting a same event as the event to be processed. The request of events from the control devices are stored in the above described memory unit. In the following embodiment, the event permission is sent to a control device that previously sent an event pattern in the Event-Wait-Message which matches the event pattern registered in the event flag.

In the group object, the event information about an event to be processed is stored as an event flag. When a control device wishes to execute a specific event process, it will send the event request for the specific process to the group object. The group object stores the event request in the memory unit for the event list. When a new event flag is registered or renewed in the group object, the group object will detect a specific control device in the event list which sent the same event request as the event flag, and send an event permission to the control device. All control devices which received such event permission will start processing of the event simultaneously. The synchronized control is processed as explained above.

Another type of group object is for exclusive control used to control a plurality of control devices connected to a network exclusively. This type of group object comprises 1) a communication means to communicate with the control devices to be controlled exclusively which are present among a plurality of other control devices, 2) a memory unit to memorize the maximum number of possible devices which are allowed to activate together (in this embodiment, a semaphore counter), 3) a message generating means to generate a message of event permission to a control device which requests a permission to activate, and the judgement is done based on the number of possible devices memorized in the above memory unit when the request of activation (in the embodiment, called as a Semaphore-Obtaining-Message) is received by the group object, 4)renewal means to renew the number of possible devices in the above memory unit.

In the memory unit, the maximum number of devices which are allowed to activate together is stored. When a control device wishes to activate, it will send a request of activation to the group object. The group object, then, judges if the request of activation is acceptable or not based on the maximum number of possible devices. If yes, the group object will send back the message of event permission to the control device which is requesting permission to activate. If there are already more currently activating devices than the preset maximum number, the group object will not increase the activating devices by judgement based on the maximum number of possible devices, and send a message of rejection. Thus the exclusive control will be executed. The judgement is performed not only at the time of receiving the request, but also within the certain time interval after the receiving the request (this is called as semaphore waiting time). In other words, it includes every thing to judge the permission/rejection based on the result that the request of permission is received.

Yet another type of group object is for sequential control used to control a plurality of control devices connected to a network sequentially. This type of group object comprises 1) a communication means to communicate with the control devices to be controlled sequentially which are present among a plurality of other control devices, 2) a memory unit to memorize the sequential list which defines the sequence of process, 3) a message generating means to generate a message for sequential execution to the control devices based on the sequential list which is stored in the memory unit at the time of receiving the request of sequential control.

The group object can know the sequence of the activation based on the sequential list of which control device should be activated next. When the request of activation is received by the group object, the group object will send an activation command to the control device which is at the top of the sequential list. When the execution is completed at the control device, the group object will send another activation command to the next control device. Since the activation command will be sent according to the sequential list, it is possible to carry out the sequential control. The timing to send an activation command is after the group object receives a message of completion from a control device, but it is not always limited to this timing in this invention. If the group object knows the execution time of an individual control device, the group object will send a next activation command after the interval time between an activation request from a control device and a next activation request from a next control device has elapsed.

DETAILED DESCRIPTION OF THE INVENTION

Figure 1A:
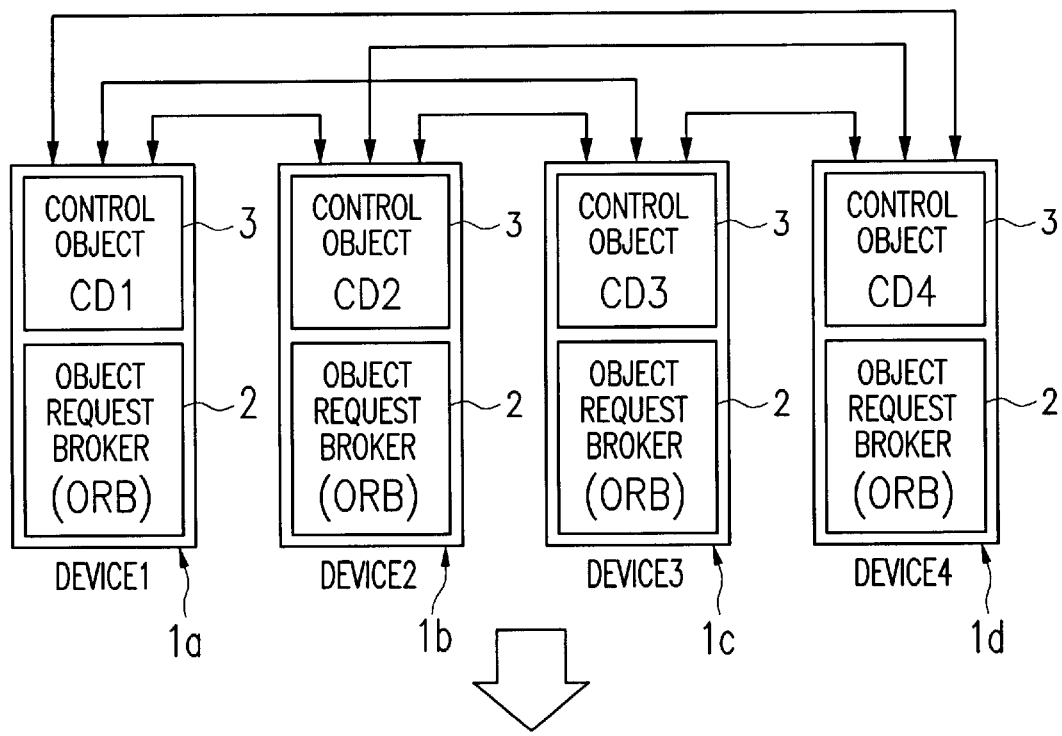
FIG. 1 shows the prior art.
Figure 1B:
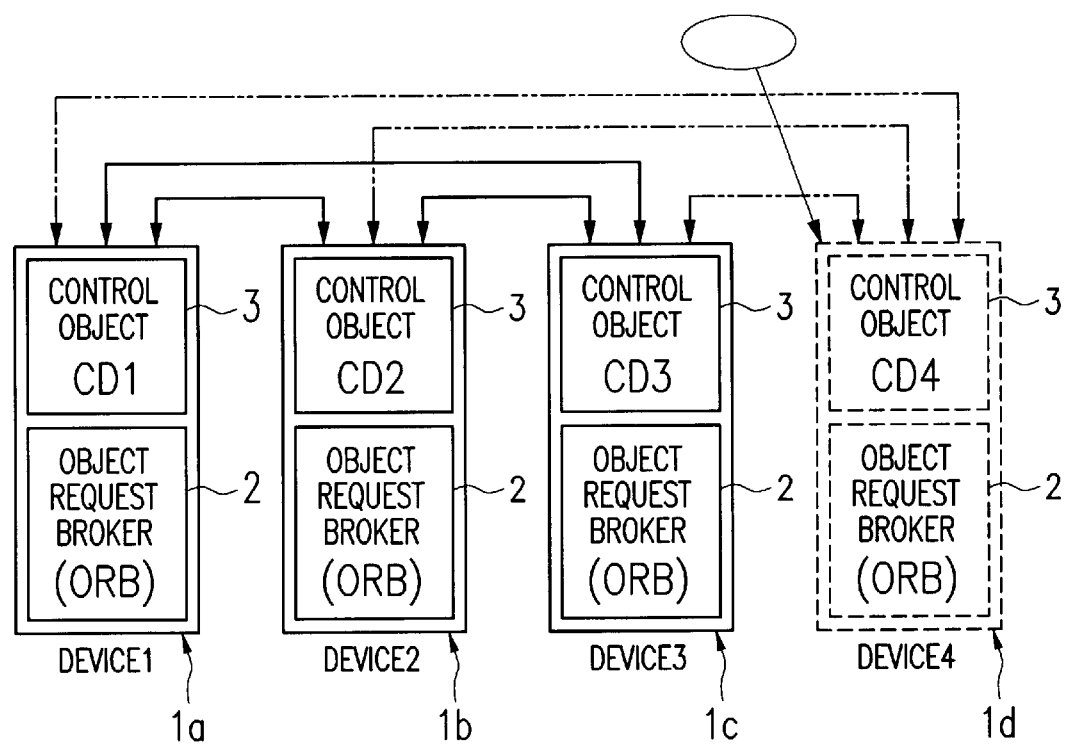
Figure 2A:
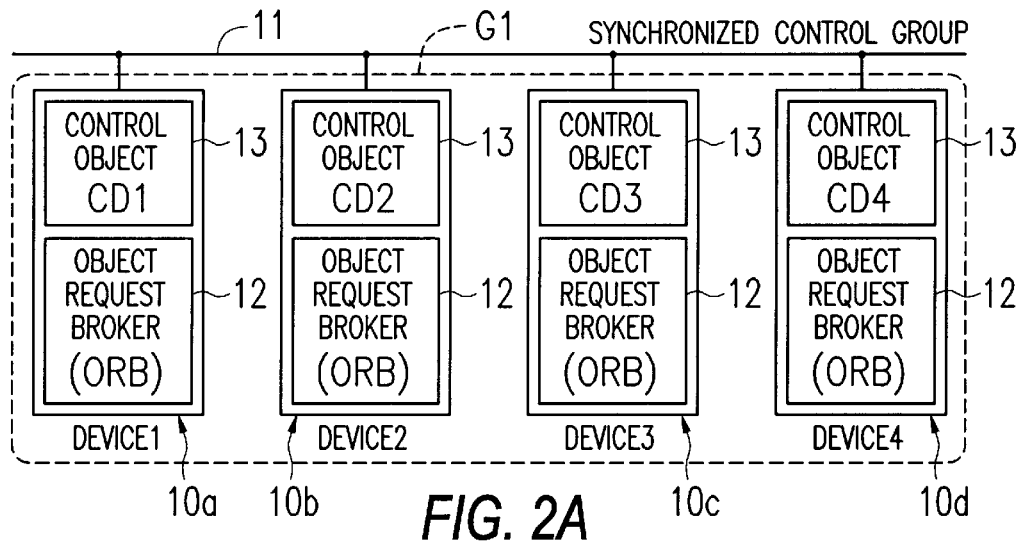
FIG. 2 shows an example of a network provided with a group object.
Figure 2B:
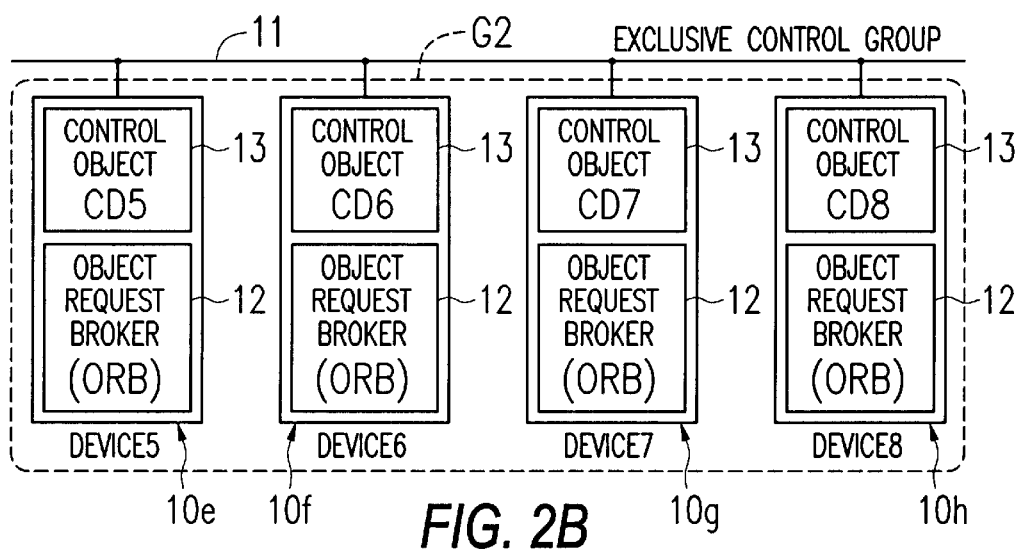
Figure 2C:
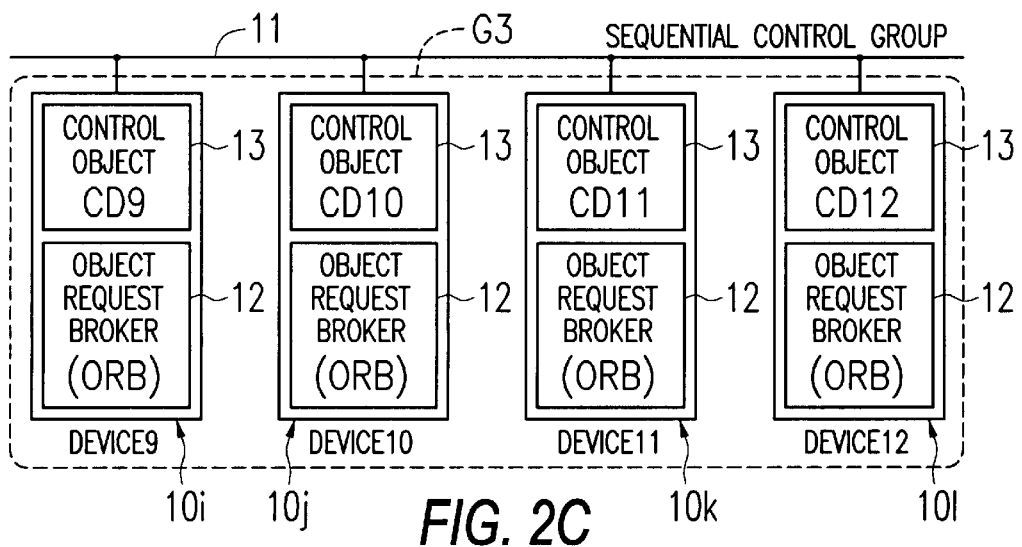

FIG. 2 shows a network in which a plurality of control devices are connected. As shown in this drawing, a plurality of control devices 10a, 10b, . . . . are connected to the network by communication line 11 of a wire or a wireless. In this drawing, 12 control devices are shown, but it is not limited to 12 control devices. Three communication lines 11 are shown here which are parallel, and they are connected to each other (not shown in this drawing), and they form a net work.

When it is not necessary to distinguish each control device, they are expressed by "device 10". Each control device 10 comprises an object request broker (ORB) 12 and the control object 13. The control object is connected to communication line 11 to transmit the information.

Among the control devices 10, the first through the fourth control device 10a–10d execute a synchronized control in a cooperation control, the fifth through the eighth control device 10e–10h execute an exclusive control in a cooperation control, and the ninth through the twelfth control device execute a sequential control in a cooperation control. In an actual network, it is not always true that these three types of controls are executed together, and there can be one or two types of control or a plurality of control groups which are the same type of control mentioned above.

Figure 3:
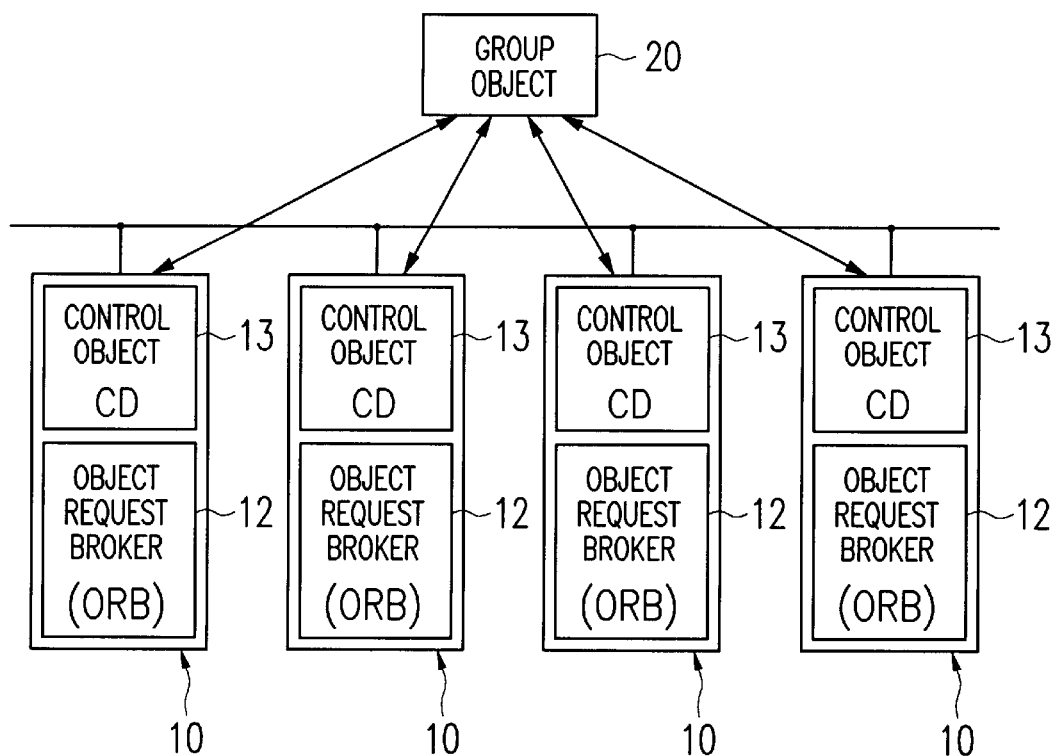
FIG. 3 shows the relationship between the group object and the control device.

In this invention, the control devices in cooperation control are divided into groups according to the type of the cooperation control. The control devices in a group are independent from other control devices in other groups, so they can cooperate only with the control object 13. In other words, the control devices are controlled by each group. As shown in FIG. 3, the group object 20 has the basic functions which can interface with the control devices in the group, and each control device is controlled by the group object 20.

Because of the reason mentioned above, each control device 10 in cooperation control can have a communication program which interfaces only with the group object 20. If a new additional control device is installed or deleted after the network is established, it does not influence any of the control devices, so it is easy to change the system.

In an actual network, the group object is installed in one of the control device. It is, therefore, not necessary to have an independent device for the group object such as a client computer server which controls a plurality of client devices.

Figure 4:
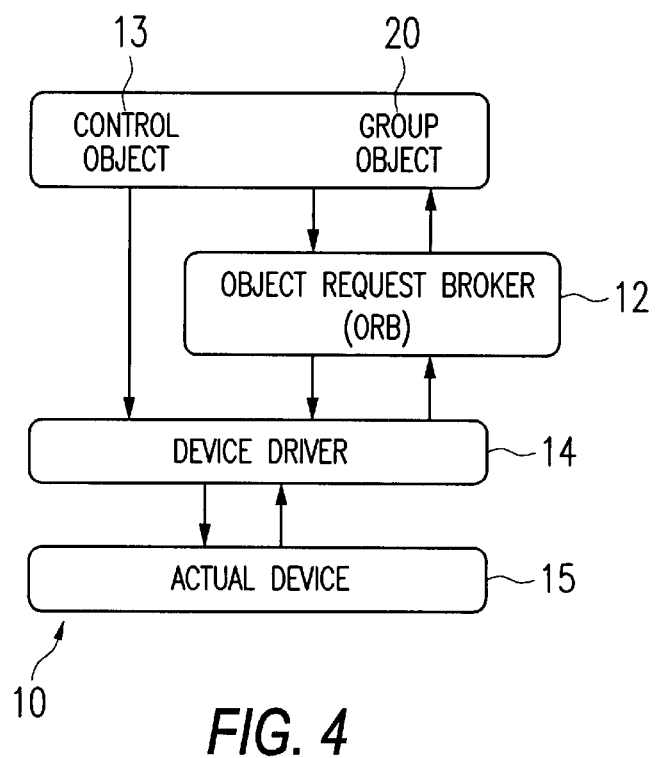
FIG. 4 shows the internal structure of the control object.

The actual configuration of the group object 20 is shown in FIG. 4. In this example, the group object is installed in a control device 10. The ordinary control device 10 is the one without the group object shown in this figure.

As shown in FIG. 4, in a control device 10, the control object 13 sends a message (control command) to device driver 14 according to a message from object request broker 12. Device driver 14 has an interface to the control object 13 to receive a message (control command), and it controls the actual functional device 15 according to the message from the control object 13. The actual functional device 15 is a functional working portion of the system.

Object request broker 12 has a function to seek the specific object having the indicated object ID (oid) in the system, send a message, or send the received message to an object having the (oid). The functions of units 12–15 are the same as the ones in the prior arts, we will not omit the detailed explanation here.

We will now explain the details of the control object 13 and the group object 20, and the data transmission between them which are the essential part of this invention. The following is a detailed explanation of the three cooperation control types.

(Synchronized Control)

Figure 5:
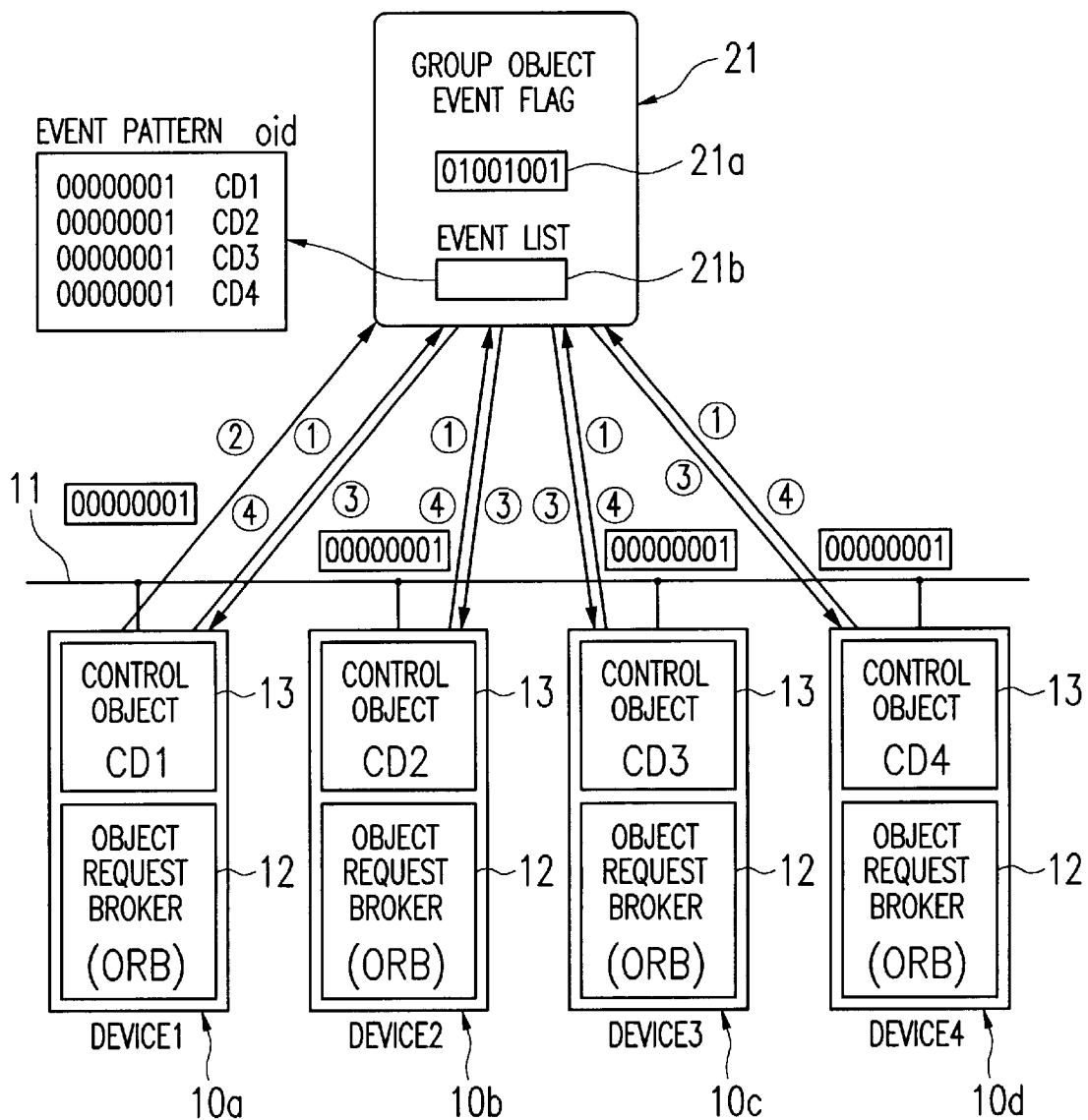
FIG. 5 shows the group object and the control object controlled by the group object which executes the synchronized control.

Synchronized control is defined as a plurality of control devices in a network function in synchronized cooperation control as shown in FIG. 5. The messages are transmitted between the first through fourth control devices 10a–10d and a group object 21.

The group object 21 comprises 1) event flag storage 21a to store the current event flag which is currently under execution in the system, and 2) event list storage 21b to store the Event-Wait-Message from the control devices 10a–10d which are in the group. The event list consists of an event pattern, and own object ID.

We will now explain how this system works. Each control object 13 sends the Event-Wait-Message to the group object 21, and the group object store received the Event-Wait-Message in event list 21b. The group object 21 seeks event pattern in event list which matches event flag stored in event flag storage 21a. If it matches, then the group object will send an Event-Occurrence-Message to the control object identified by the ID (oid). The control object which received such message will demand the actual functional device to start the execution.

If the event patterns in the Event-Wait-Message sent from the control objects 13 in control devices 10a–10d are set identical, and the event flag is set to the same event pattern, The Event-Occurrence-Message will be simultaneously sent to control devices 10a–10d. Each control device will be, then, activated simultaneously. This is how to synchronize a plurality of functional devices in the network.

In order to achieve the synchronized processing functions mentioned above, and more stable operation in the network, the following functions are equipped in the objects. There are transmission processing to transmit the messages for the cooperation control between the group object 21 and the control devices 10a–10d according to the order shown by the circled numbers in FIG. 5. The control object 13 executes the functions according to the flow chart shown in FIG. 6. The group object 21 executes the processing according to the flow chart shown in FIG. 7 through FIG. 9.

Figure 6:
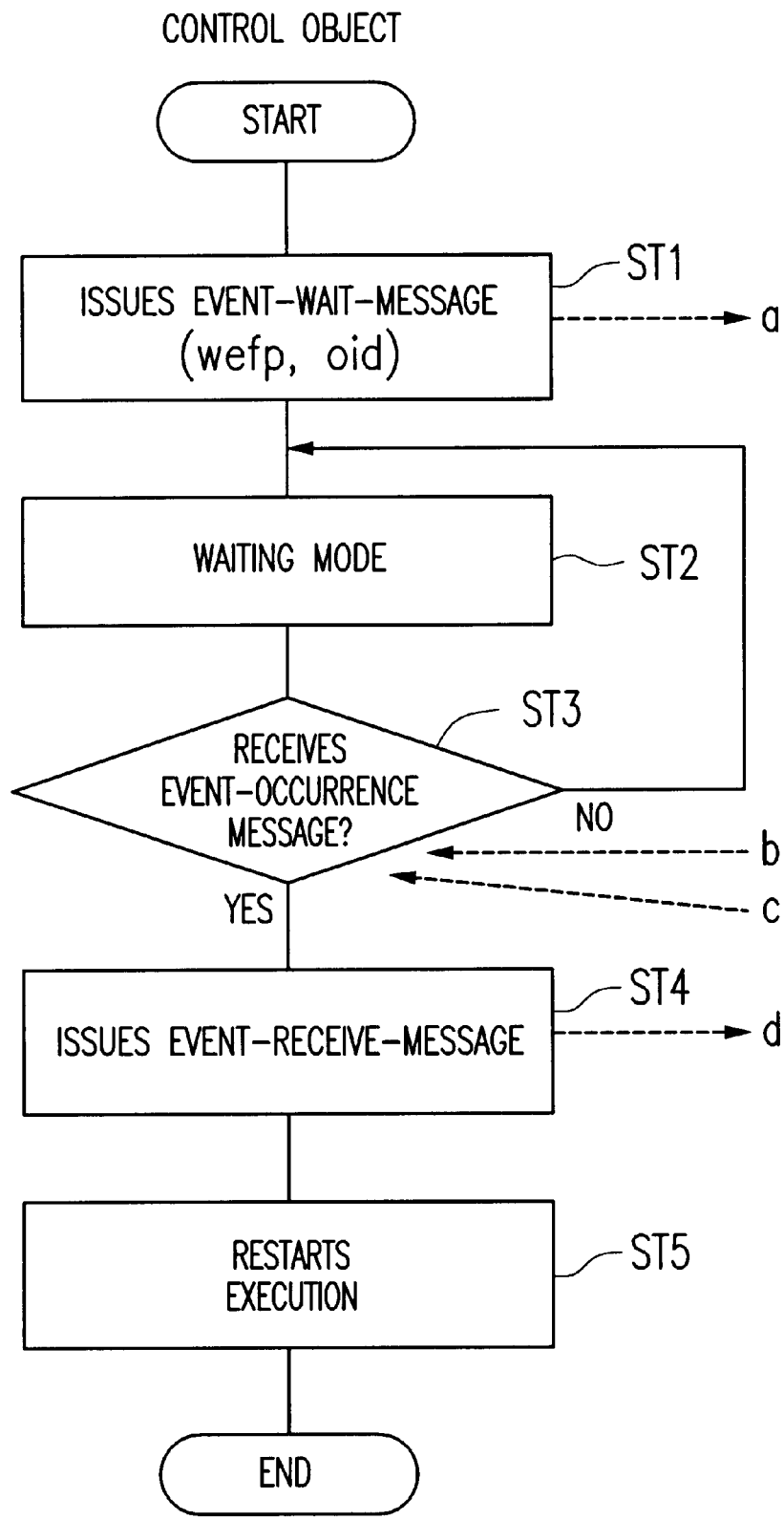
FIG. 6 shows a functional flow chart of the control object shown in FIG. 5.

FIG. 6 shows the operation of a control object 13. The control object 13 sends the Event-Wait-Message to the group object 21 (ST1). This Event-Wait-Message consists of an event pattern (wefp) and it's own identification (oid). In the example shown in FIG. 5, the event pattern consists of 8 bits length, and it is "00000001". The object ID of the control objects 10a–10d are ID1, ID2, ID3, and ID4 respectively.

After the Event-Wait-Message is sent to the group object, the control object 13 is then in a waiting mode for the Event-Occurrence-Message which will be sent from the group object 21 (ST2, ST3). When the Event-Occurrence-Message is received, it goes to step 4, and the control object 13 sends an Event-Receive-Message to the group object 21 (ST4), and then, it executes the event which the control object requested to activate the connected actual functional device 15.

Although it is not shown in this flow chart, the control object 13 has a function to send an Event-Registration-Message to the group object 21. The Event-Registration-Message sends registration event pattern (nefp), and the group object 21 will send an as the registration event pattern. In other words, each control device will be synchronized to activate the connected actual functional devices 15 after the registration event pattern is registered.

Figure 7:
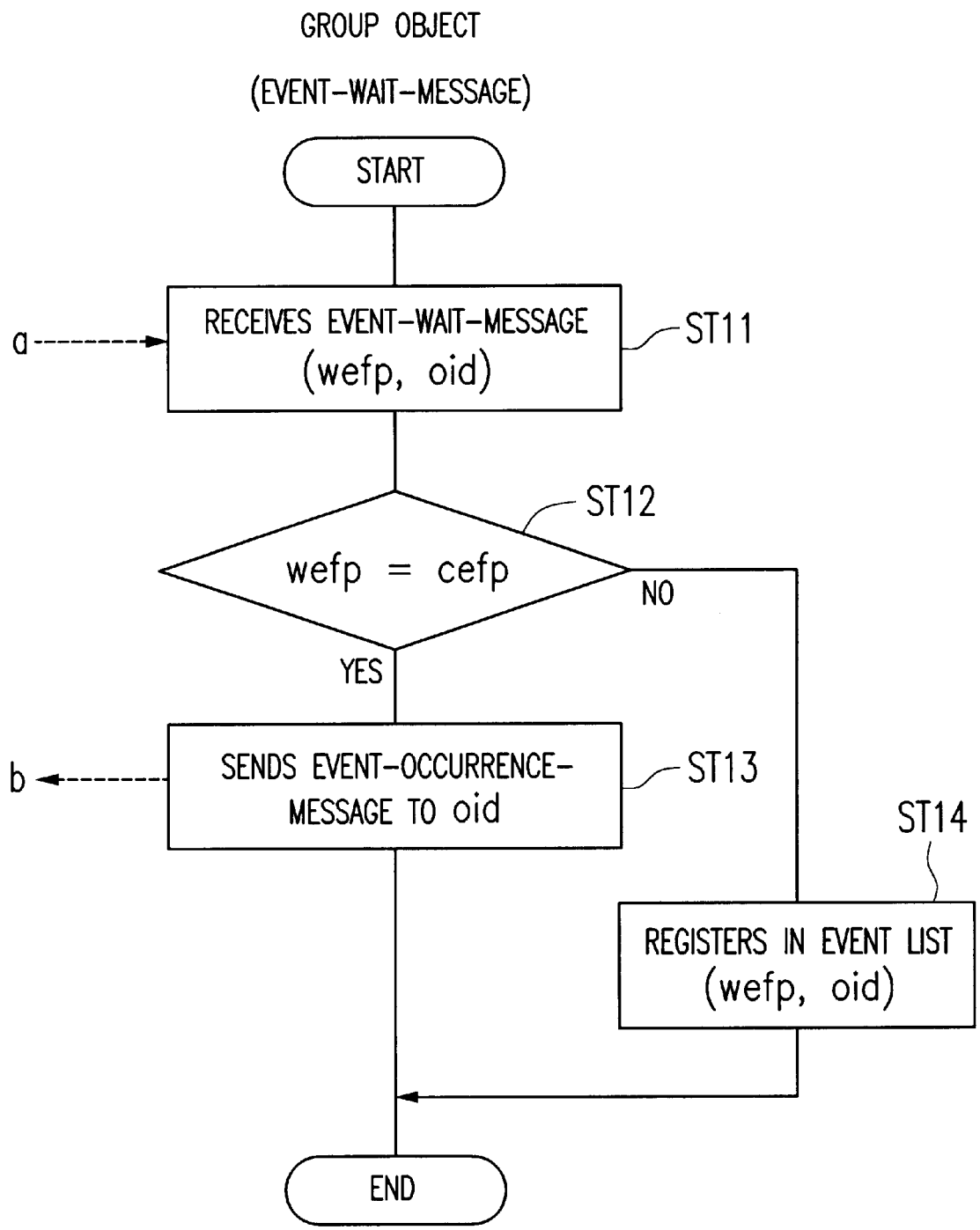
FIG. 7 shows a first functional flow chart of the group object shown in FIG. 5.
Figure 8:
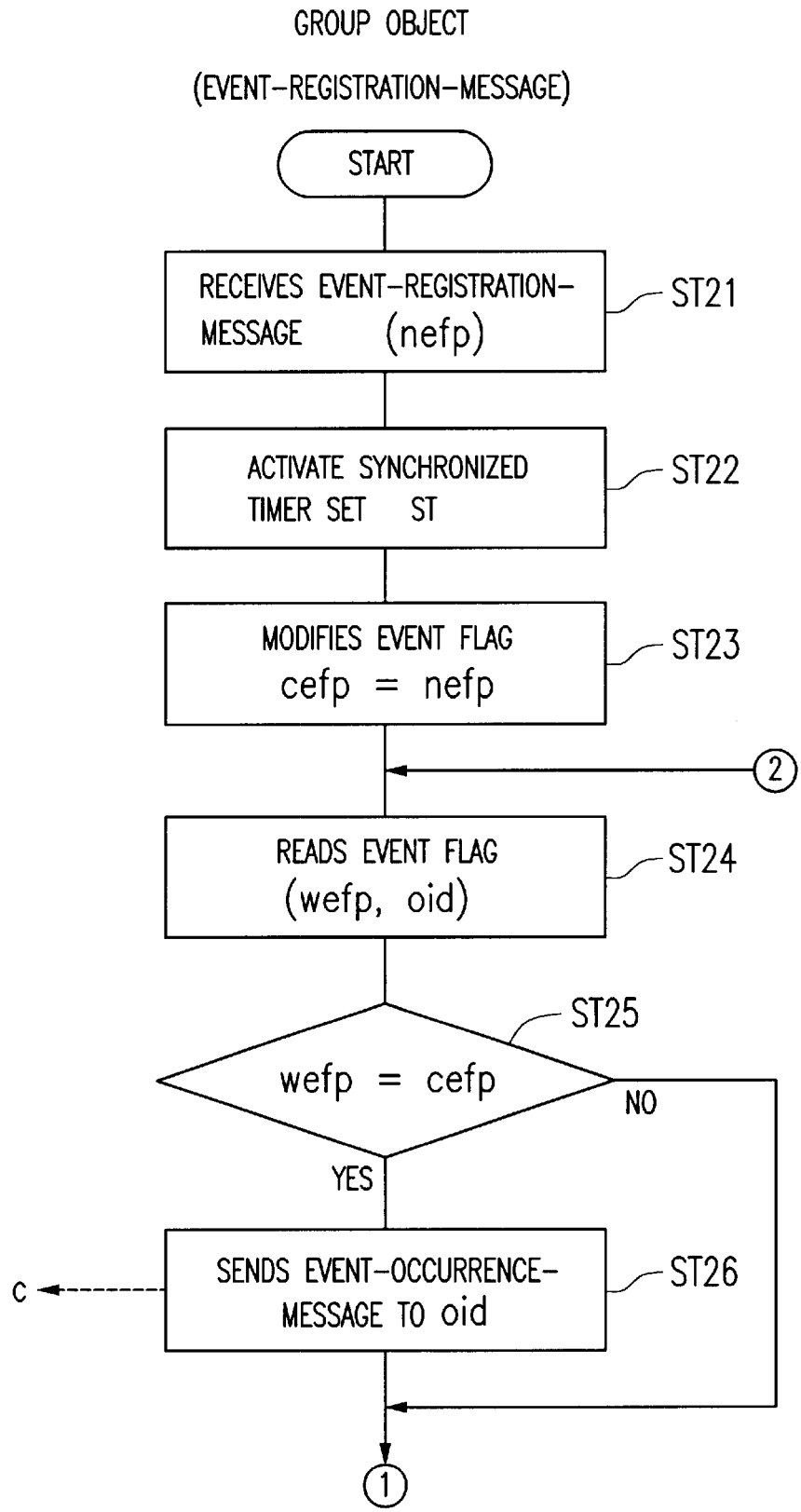
FIG. 8 shows a second functional flow chart of the group object shown in FIG. 5.
Figure 9:
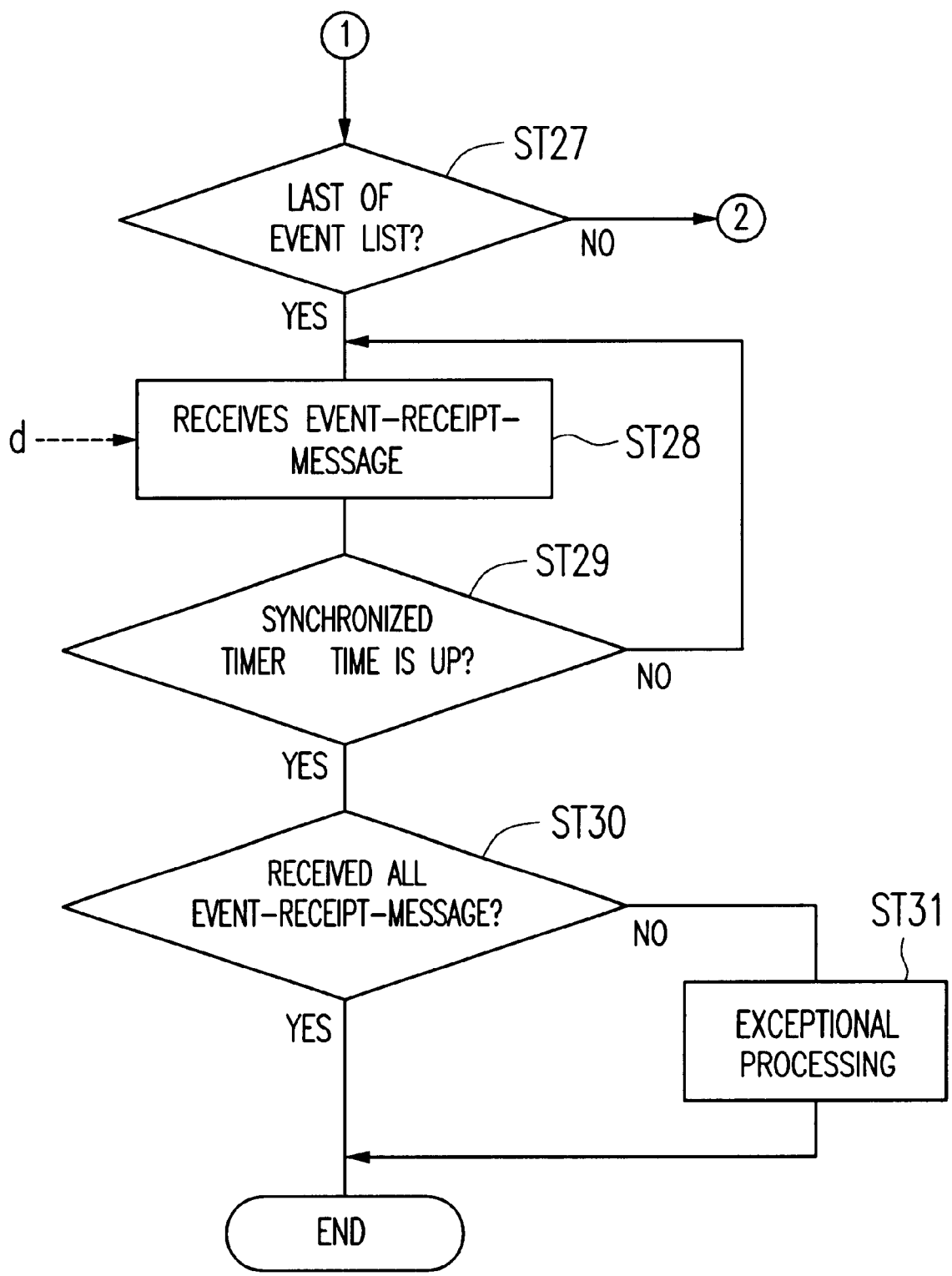
FIG. 9 shows a third functional flow chart of the group object shown in FIG. 5.

In the group object, there are two types of procedures, one is for Event-Wait-Message (shown in FIG. 7), and another is for the Event-Registration-Message (shown in FIGS. 8 and 9).

In the Event-Wait-Message shown in FIG. 7, the group object 21 receives the Event-Wait-Message (wefp, oid) from the control objects in the group (ST11). After receipt, it compares the received event pattern (wefp) with the current event flag pattern (cefp) stored in event flag storage 21a, and judges if they are the same (ST12).

If the same, the group object will recognize the control object 13, which had sent the Event-Wait-Message, by the following (oid), and it sends the Event-Occurrence-Message to the control object (ST13). If not the same, the group object registers the Event-Wait-Message (wefp, oid) in the event list (ST14).

In the Event-registration-Message shown in FIG. 8, the group object registers the Event-Registration-Message to register the event (ST21). The timer length ST (the user can preset the length) is set in the synchronized timer (ST22). The event flag is modified according to the Event-Registration-Message (ST23).

The group object reads the event list (ST24), and judges if the registered event (nefp) is the same as the waiting event (wefp) (ST25) . If same, the group object sends the Event-Occurrence-Message to the control object identified by (oid) (ST26). This step is executed to every control object which is registered in the event list storage. This step is sequentially executed according to the order listed in the event list, and it checks if it is an end of the event list. If not the end, it returns to step 24 (ST27).

After it comes to the end of the event list, the group object 21 waits to receive the Event-Occurrence-Message (ST28) until the time period of the synchronized timer is up, which was activated at step 22 (ST29). When the time is up, it goes to step 30. The group object 21 judges if the Event-Receipt-Message came back from all of the control devices to which the Event-Occurrence-Message was sent at step 26. If yes, it ends normally. If even one did not come back, it executes the exceptional routine (ST31). The exceptional routine is, for example, to send a halt command to all of the control devices.

The following is the relationship between the operations mentioned above and the operations marked by the circled numbers in FIG. 5. The circled number 1 is the Event-Wait-Message, and it is a processing primary at step 1. When the group object 21 receives this message, it executes the process shown in FIG. 7. The circled number 2 is the Event-Registration-Message. In FIG. 5, the circled number 2 is indicated only from the control object 10a, but in fact, it can be fixed to be sent from only one control object as shown here, or alternatively can be sent from a plurality of control objects to transmit the Event-Occurrence-Messages. The circled number 3 is the Event-Occurrence-Message, and it corresponds to step 12 through 14, and steps 25, and 26. The circled number four corresponds to step 28 and the following steps shown in FIG. 9.

(Exclusive Control)

Figure 10:
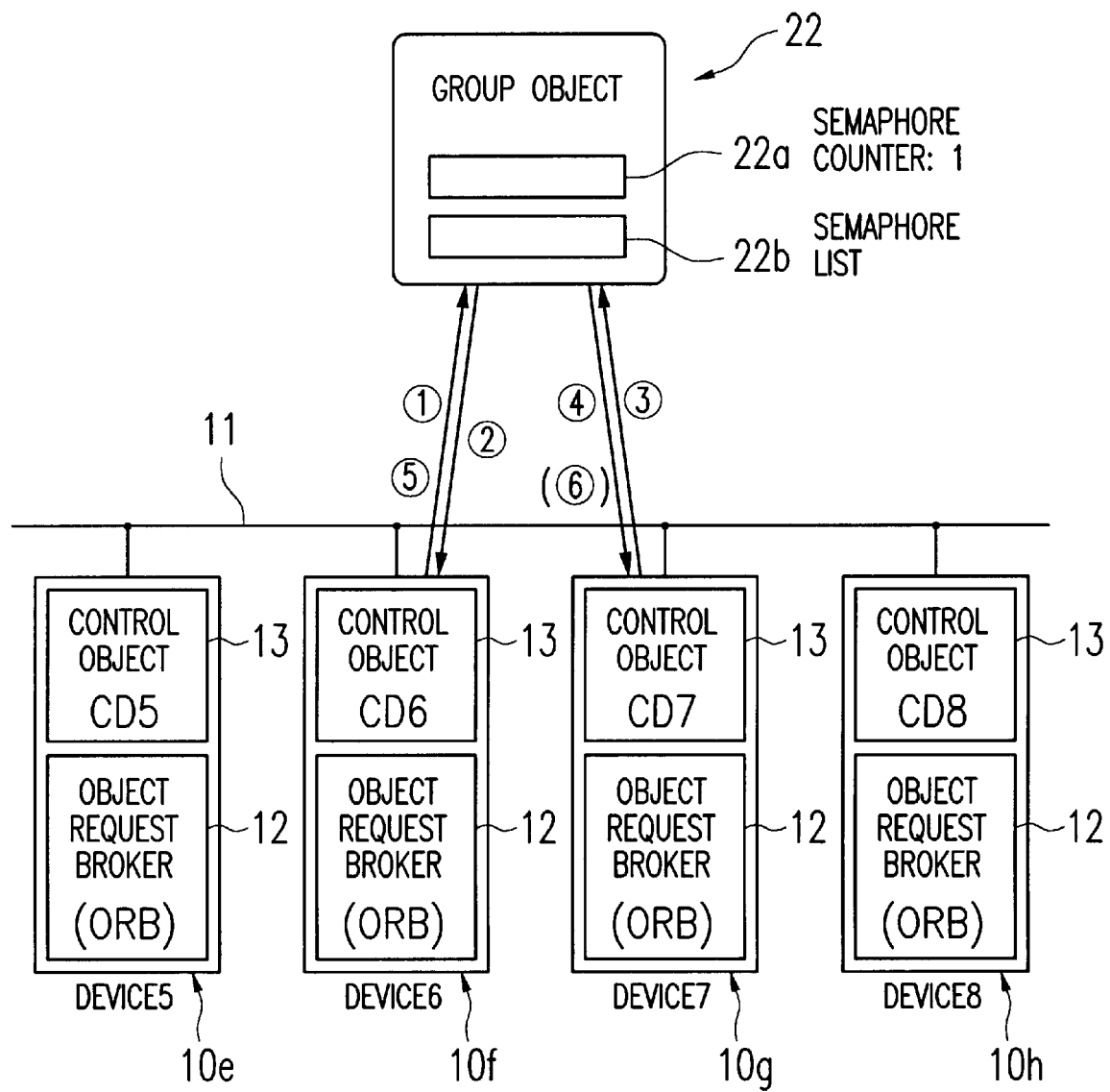
FIG. 10 shows the group object and the control object controlled by the group object which executes the exclusive control.

An exclusive control is defined as one type of a cooperation control which does not allow simultaneously activating more number of control devices than previously determined, which is an opposite control method from the synchronized control already mentioned above. The system structure of the exclusive control is shown in FIG. 10. In this network, The messages are transmitted between fifth through eighth control devices 10e–10h, and a group object 22 via the communication line 11.

In this embodiment, a semaphore counter 22a is provided in the group object 22, and it indicates the maximum number of the control devices which are allowed to activate simultaneously. In the semaphore counter, zero or more integral number can be set.

The initial set number to register in the semaphore counter is the maximum number of the control devices which are activated simultaneously. If the initial setting of semaphore counter 22a is 1, it activates only one control device in the system. The counter value of the semaphore counter 22a is decreased accordingly when more control devices (control objects) are activated. If the counter value of the semaphore counter comes down to zero, it is not possible to add more control devices in the network, then the response message can be sent to notify of that fact. When all of the control devices in activation are deactivated, naturally the counter value will be increased accordingly.

The group object 22 is equipped with a semaphore list storage 22b. When the group object 22 receives a Semaphore-Obtaining-Message from the control object 13 to express that the control device of the control object 13 wishes to be activated, and the semaphore counter value is zero at that time and the group object 22 can not send the permission for activation, the group object 22 will then register the object ID (oid) of the control device 13 for the predetermined time length which is sent from the control object 13. When the predetermined time passes and the semaphore counter remains still zero so no activation is made, then rejection (False) message will be sent to the control object.

The following is a functional description of the exclusive control. When the control object of each control device 10e–10h wants to be activated, it issues the Semaphore-Obtaining-Message to the group object 22 in the group. The group object 22 searches the counter value of the semaphore counter 22a. If the counter value is not zero, the group object 22 transmits the permission message (True) to the control object, and decreases the value of the counter value by 1. If the counter value is not zero and it is not allowable to activate the control device, the group object registers the object ID of the control object which sent the activation request, and waits for the predetermined time period. If the time period passed, and the counter value is still zero, then rejection message (False) is sent back, and the activation request is deleted from the semaphore list.

When the control device receives the activation permission, it executes the predetermined job. When it is completed, then a Semaphore-Returning-Message is sent back to the group object 22. The group object 22, then, increments the counter value of the semaphore counter 22a by 1.

Figure 11:
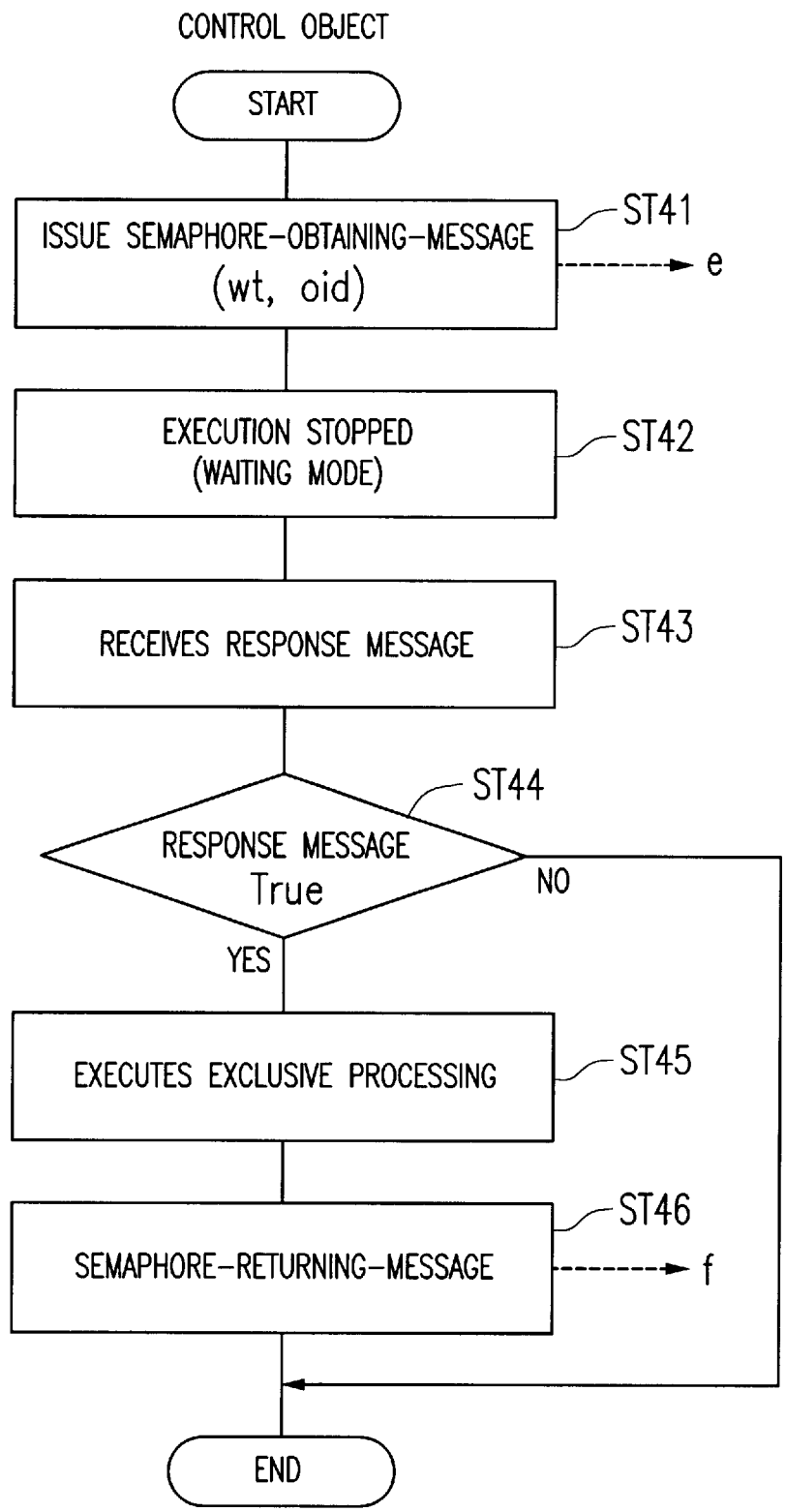
FIG. 11 shows a functional flow chart of the control object shown in FIG. 10.

In order to achieve the exclusive processing functions mentioned above, and more stable operation in the net work, the following functions are equipped in the control and the group objects. The functions of the control object 13 are shown in FIG. 11. The control object issues the Semaphore-Obtaining-Message to the group object 22 (ST41). This message contains semaphore waiting time (wt) and the own ID (oid). The semaphore waiting time is defined by a maximum allowable waiting time when the other devices are already activated up to the maximum number which are allowed to activate simultaneously and it is not possible to issue the permission to activate immediately. The object ID of the fifth through the eighth control devices 13 are CD5 through CD8.

When the control object issued a semaphore request, it stops the job, and waits until the response comes back from the group object 22 (ST42, ST43). When the response comes back, it judges if the response is True or False (ST44) . If True, it executes the predetermined exclusive control job (ST45) . When it is completed, the control object returns a Semaphore-Returning-Message to the group object 22, and completes the job (ST46). If the response from the group object 22 is False, it means the step 44 is NO, then the control object completes the job.

Figure 12:
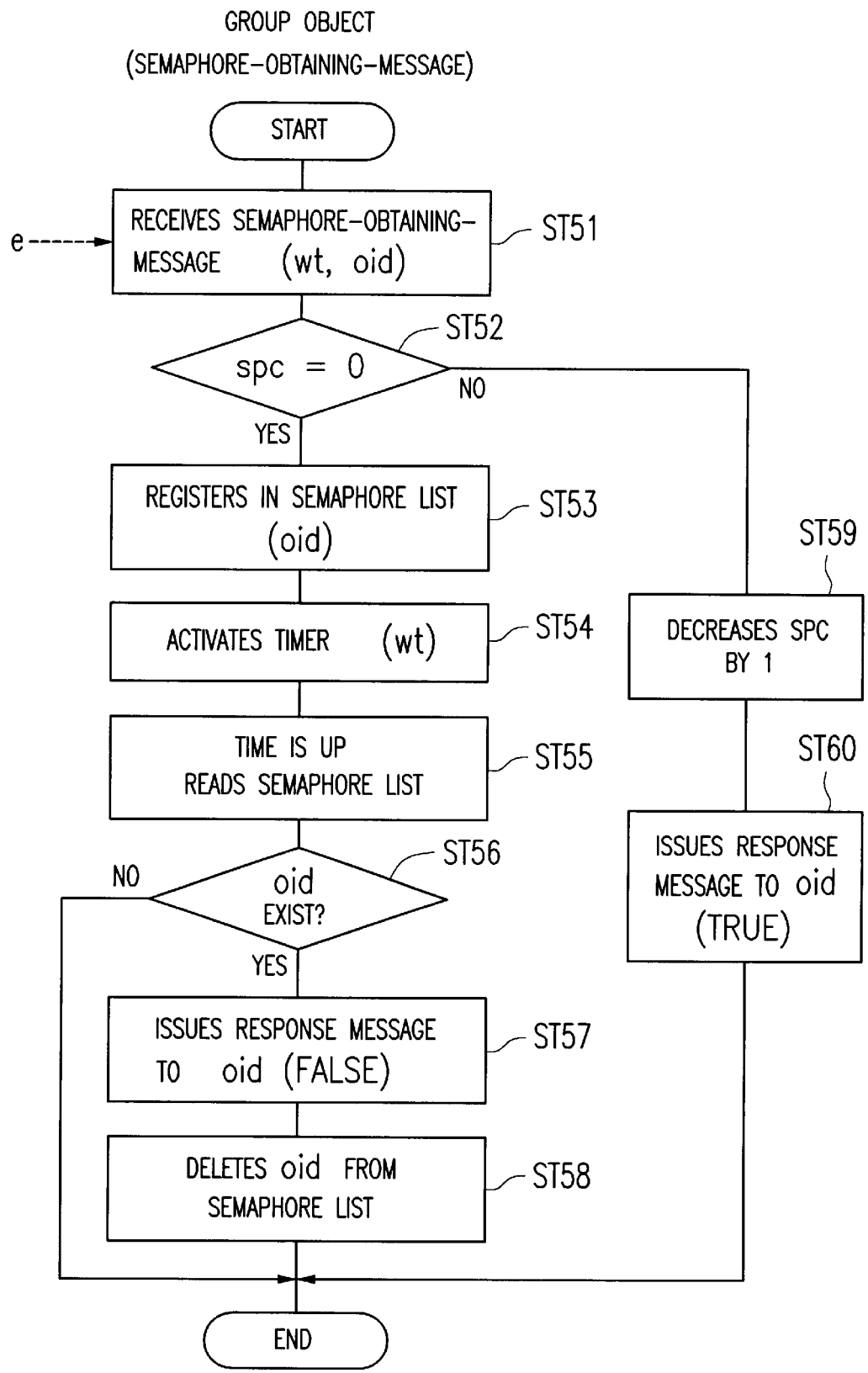
FIG. 12 shows a first functional flow chart of the group object shown in FIG. 10.
Figure 13:
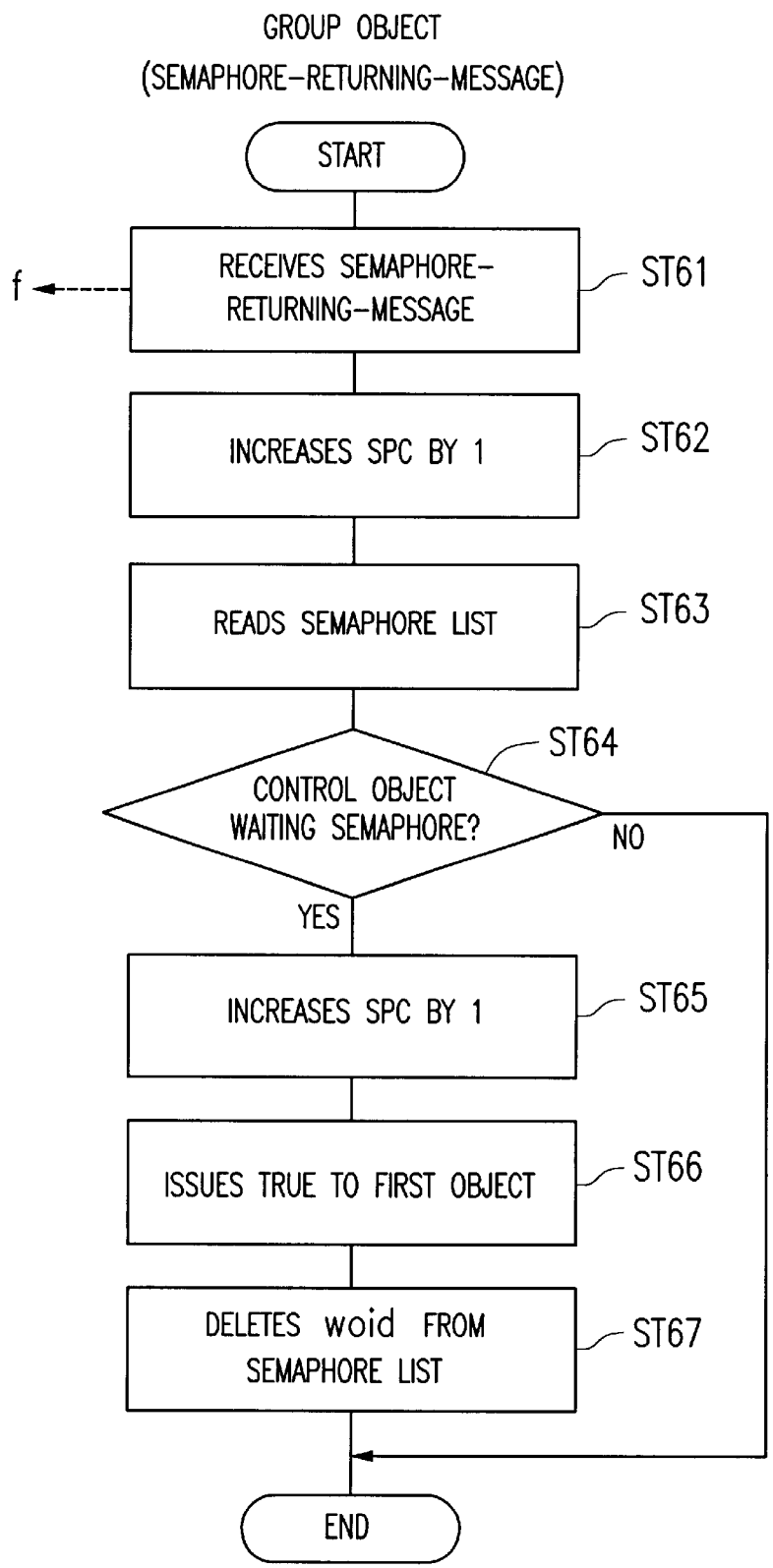
FIG. 13 shows a second functional flow chart of the group object shown in FIG. 10.

There are two types of procedures in the group object 22. One is when the group object receives the Semaphore-Obtaining-Message from the control device 13 as shown in FIG. 12, and the other is when the group object receives the Semaphore-Returning-Message as shown in FIG. 13.

In the former case, the group object receives the Semaphore-Obtaining-Message (wt, oid) from the control object 13 in the group (ST51). The group object checks the counter value spc of semaphore counter 22a if it is zero (ST52).

If (spc) is zero, it branches to NO at ST52, and goes to ST53. The ID of the semaphore-Obtaining-Message is registered in semaphore list storage 22b, and the timer value of wt is set in the timer (ST53, ST54).

When the timer is up (the time for obtaining the semaphore is up), then the group object 22 reads semaphore list, and checks if there remains any (oid) of control received in the Semaphore-Obtaining-Message in ST51 (ST55, ST56). If yes, it means that the permission for activation was not issued during the semaphore waiting time, and the False message for rejection is issued to the control device having the (oid) (ST57), and the group object deletes the (oid) from the semaphore list in semaphore list storage 22b and completes the job.

If No in step 52 when the counter value in the semaphore counter 22a is 1 or more, it is possible to activate the control device. The counter value is decreased by 1 (ST59), and the group counter issues permission message (True) to the control object of the (oid), and completes the job (ST60).

When the group object receives the Semaphore-Returning-Message as shown in FIG. 13 (ST61), the control device which will be allowed to activate is increased, so the counter value 22a of semaphore counter 22a is increased by 1 (ST62) The group object reads the semaphore list stored in semaphore list storage 22b, and judges if there is any control object waiting for a semaphore (ST63, ST64). If not, the routine will be completed. If yes, it goes to step 65. In ST65, the group object decreases the counter value by 1, and issues the permission message (True) to the control object which is at the top of the list (ST66). The group object then, deletes the (oid) from the semaphore list to which the permission was issued (ST67), and completes the job. The following is the relationship between the operations mentioned above and the operations marked by the circled numbers in FIG. 10. The circled number 1 corresponds to the Semaphore-Obtaining-Message issued when all control devices under the exclusive control are in rest, and this process primarily corresponds to step 41. After this process, the group object 22 executes the process shown in FIG. 12. This counter value of semaphore counter 22a is now 1 as shown in FIG. 10, and it goes from step 52 to step 59, and the group object issues a permission message to the control object 13 of the sixth control device 10f (this corresponds to circled number 2). After this process, the sixth control device 10f executes the predetermined job.

When the message shown as the circled number 2 is issued, the counter value is decreased by 1, and it is now zero. During this process, if the next Semaphore-Obtaining-Message (circled number 3) is sent from the seventh control device 10g, the process goes from step 52 to step 53 as shown in FIG. 12, and the ID (CD7) is registered in the semaphore list because the counter value is zero. The timer is set by the waiting time value sent in the Semaphore-Obtain-Message (circled number 3). If the time in the timer is up, and the counter value is still zero (this means the Semaphore-Returning-Message has not returned from the sixth control device 10f), rejection (False) is sent to the seventh control device 10g (circled number 4).

When the Semaphore-Returning-Message returns to the group object 22 from the sixth control device 10f, the counter value is increased by 1. If this happen before the time of the timer is up, permission is sent to the control object 13 since the ID (oid) is listed in the semaphore list (circled number 6). As shown in above, the circled 4 or 6 is selectively sent to the control object. When the counter value is zero, it is alternatively possible to send a tentative rejection message (notifying that the message is registered in the semaphore list, and it is now in waiting mode), and at later time before the time is up, the final result of the permission or rejection message can be sent to the control object.

(Sequential Control)

Figure 14:
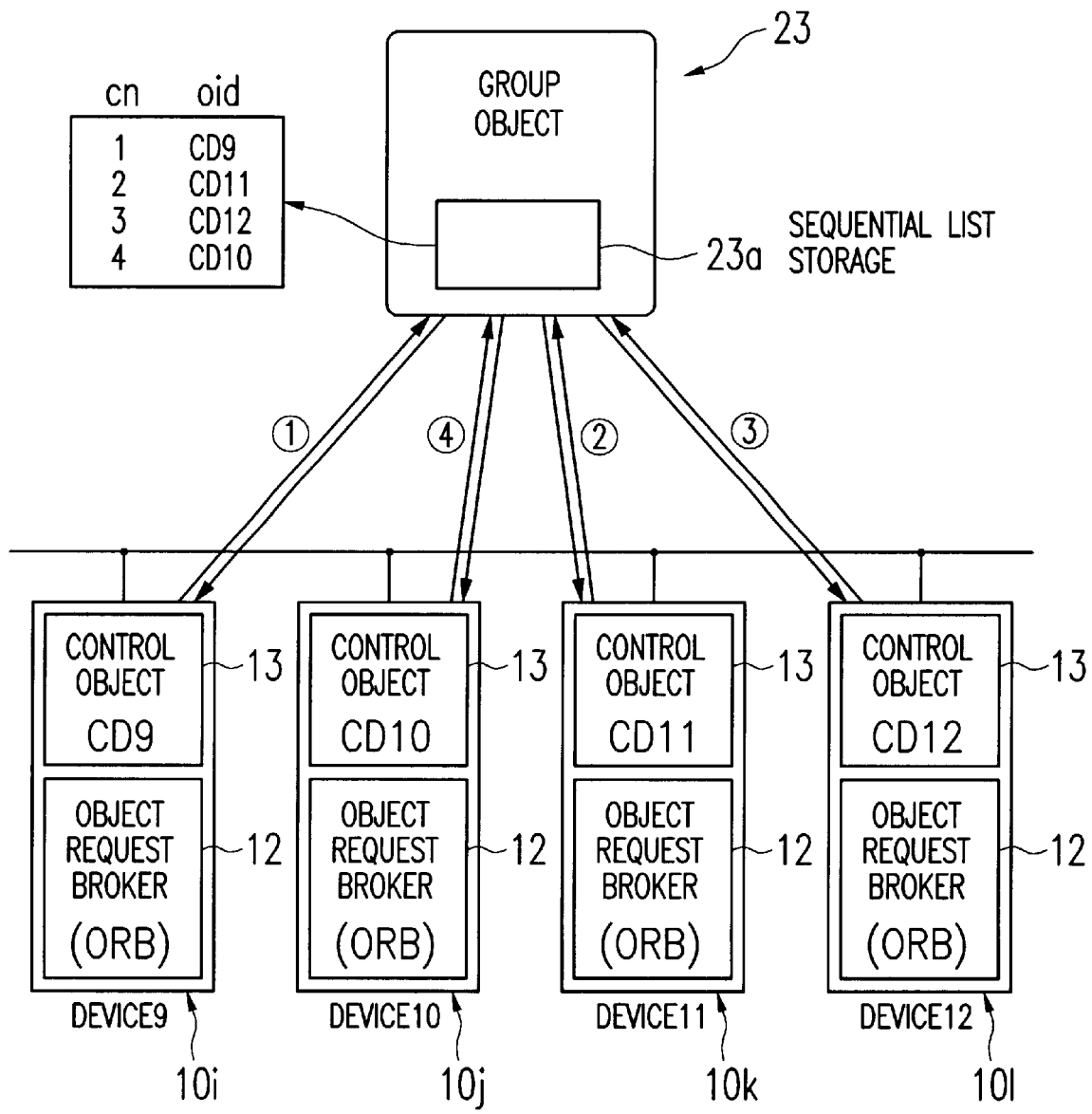
FIG. 14 shows the group object and the control object controlled by the group object which executes the sequential control.

The sequential control is defined as one type of a cooperation control which executes the process in the predetermined order as shown in FIG. 14. The sequential control transmits the messages between the ninth control device 10i through twelfth control device 10l and a group object 23 via the communication line 11.

In this embodiment, a sequential list storage 23a is provided in the group object 23, which has a sequential number (cn: the order to be executed sequentially) and the control object ID (oid). This is usually set by the user. The list has a function to keep the information of the control object which is currently under execution (coid).

The following is the functional outline of the sequential control. When the group object 23 receives the request for activating the sequential control, it reads the sequential list, and detects the ID of the control object (oid) which has the smallest sequential number. The group object 23 issues the Sequential-Execution-Message to the control object having such (oid). When the control object receives the message, it executes the predetermined process, sends a Sequential-Completion-Message to the group object, and ends the job. The group object which received the Sequential-Completion-Message sends a next Sequential-Execution-Message to the next control object which has the smallest sequential number next to the previous one. The sequential list has information about the currently executing control object (coid), and the next control object can be, therefore, detected by the coid in the sequential list after the group object receives the Sequential-Completion-Message. The steps are repeated until the end, and the sequential control can be executed this way.

Figure 15:
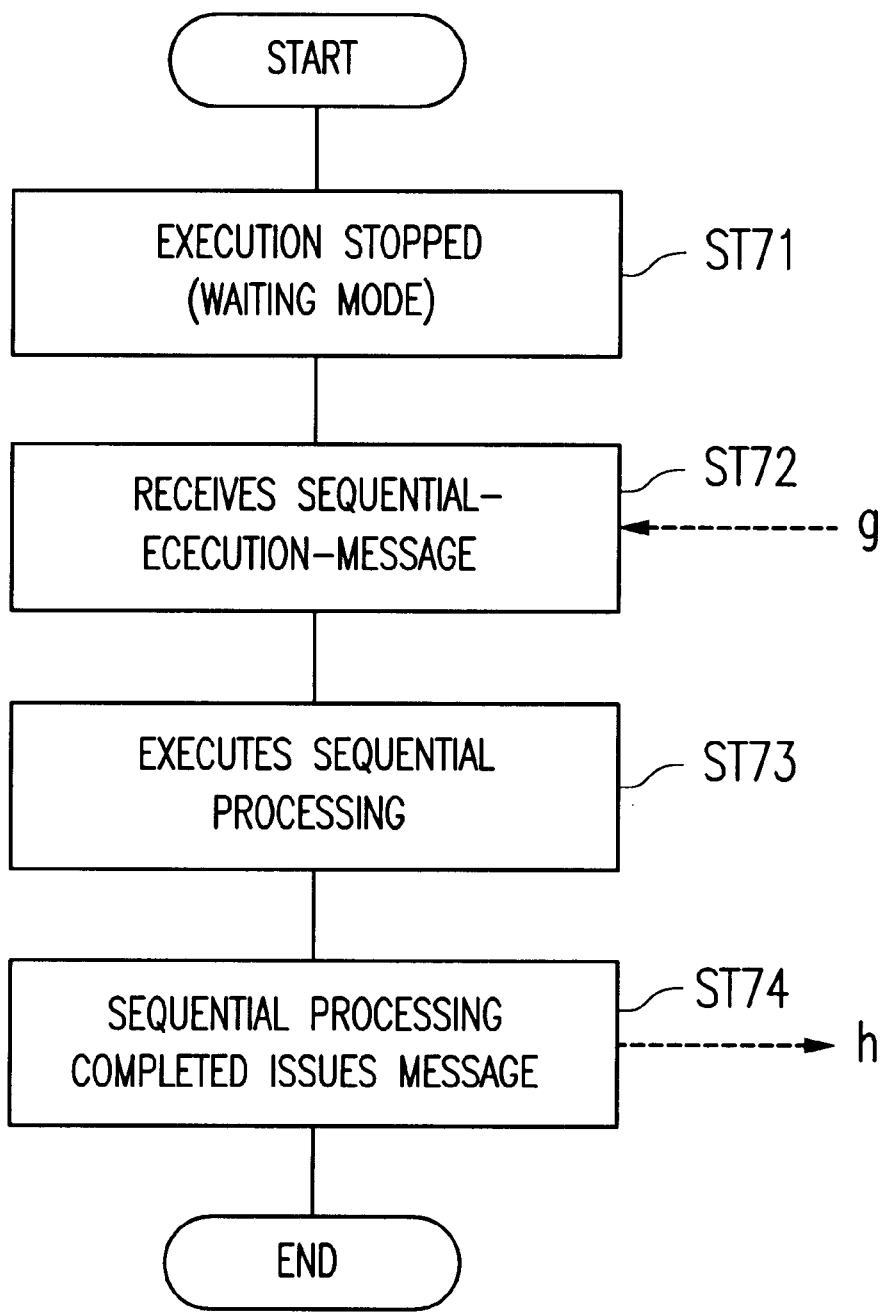
FIG. 15 shows a functional flow chart of the control object shown in FIG. 14.

In order to achieve the sequential processing functions mentioned above, and more stable operation in the net work, the following functions are equipped in the control and the group objects. As shown in FIG. 15, the control object 13 is in waiting mode to wait for a message from the group object 23 (ST71). When the control object receives the SequentialExecution-Message (ST72), it executes the predetermined process (ST73). After it is done, the control object sends the Sequential-Completion-Message to the group object, and ends the job (ST74).

Figure 16:
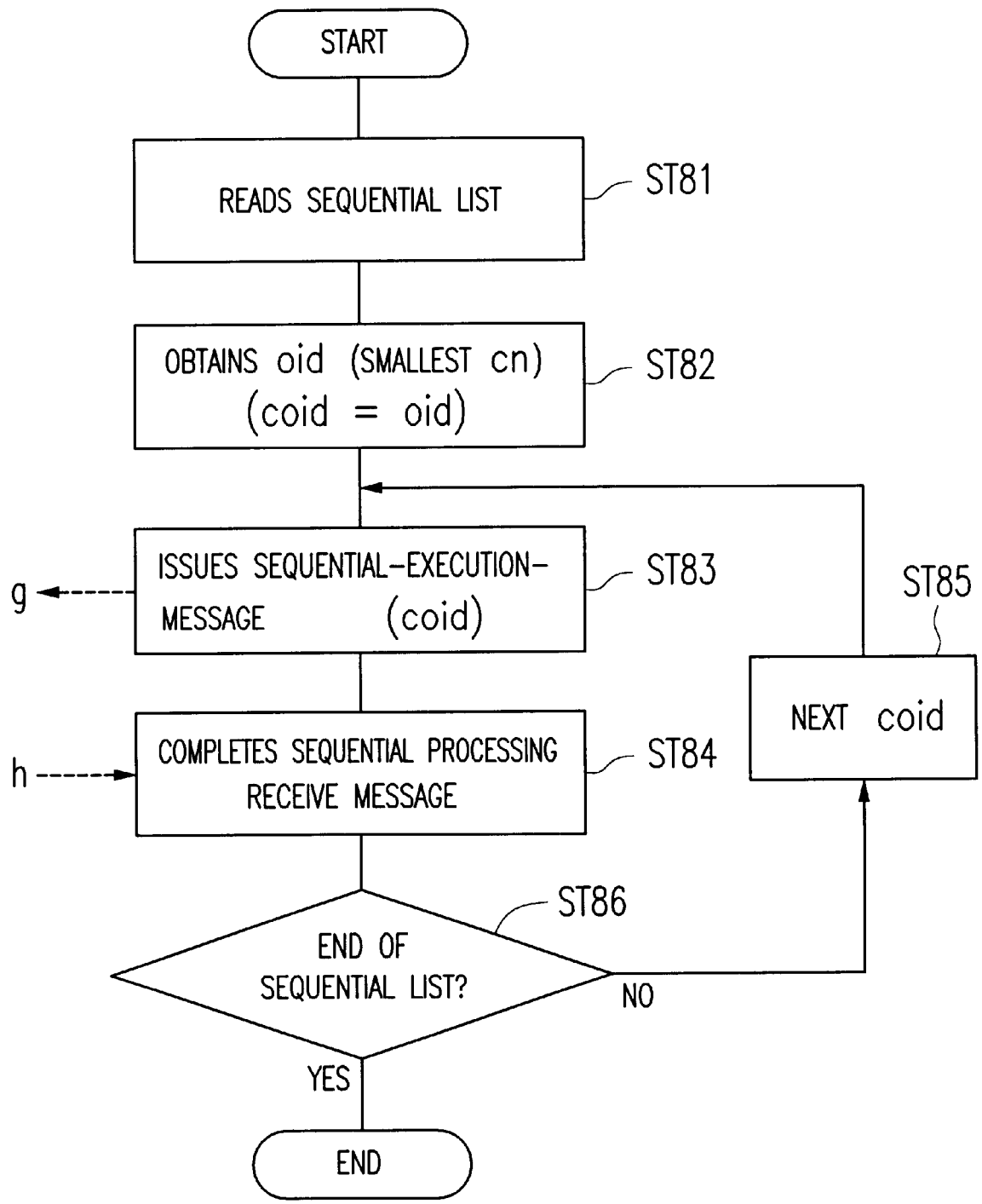
FIG. 16 shows a functional flow chart of the group object shown in FIG. 14.

The function of the group object 23 is shown in FIG. 16. The group object reads the sequential list stored in the sequential list storage 23a (ST81), detects the control number cn having the smallest (oid), and sets the (oid) as (coid) (ST82). The group object sends the Sequential-Execution-Message to the control object identified by the (coid) (obtained in step 82) (ST83).

After the Sequential-Execution-Message is sent, the group object goes into the waiting mode. When the group object receives the Sequential-Completion-Message (ST84), it judges if the current control object is the last one in the sequential list by the (coid) information (ST86). If it is the last control object, the group object ends the job. If not, the group object detects the next (oid) which has the smallest (oid) next to (coid), and set the (oid) to (coid) (ST85) Returning to step 83, the group object is ready to send the Sequential-Execution-Message to this new control object having the new (coid).

As shown in FIG. 14, if the sequence is listed in order of CD9, CD11, CD12, and CD10, then the sequential control is executed in the order of the circled numbers shown between the group object 23 and each control device.

Figure 17:
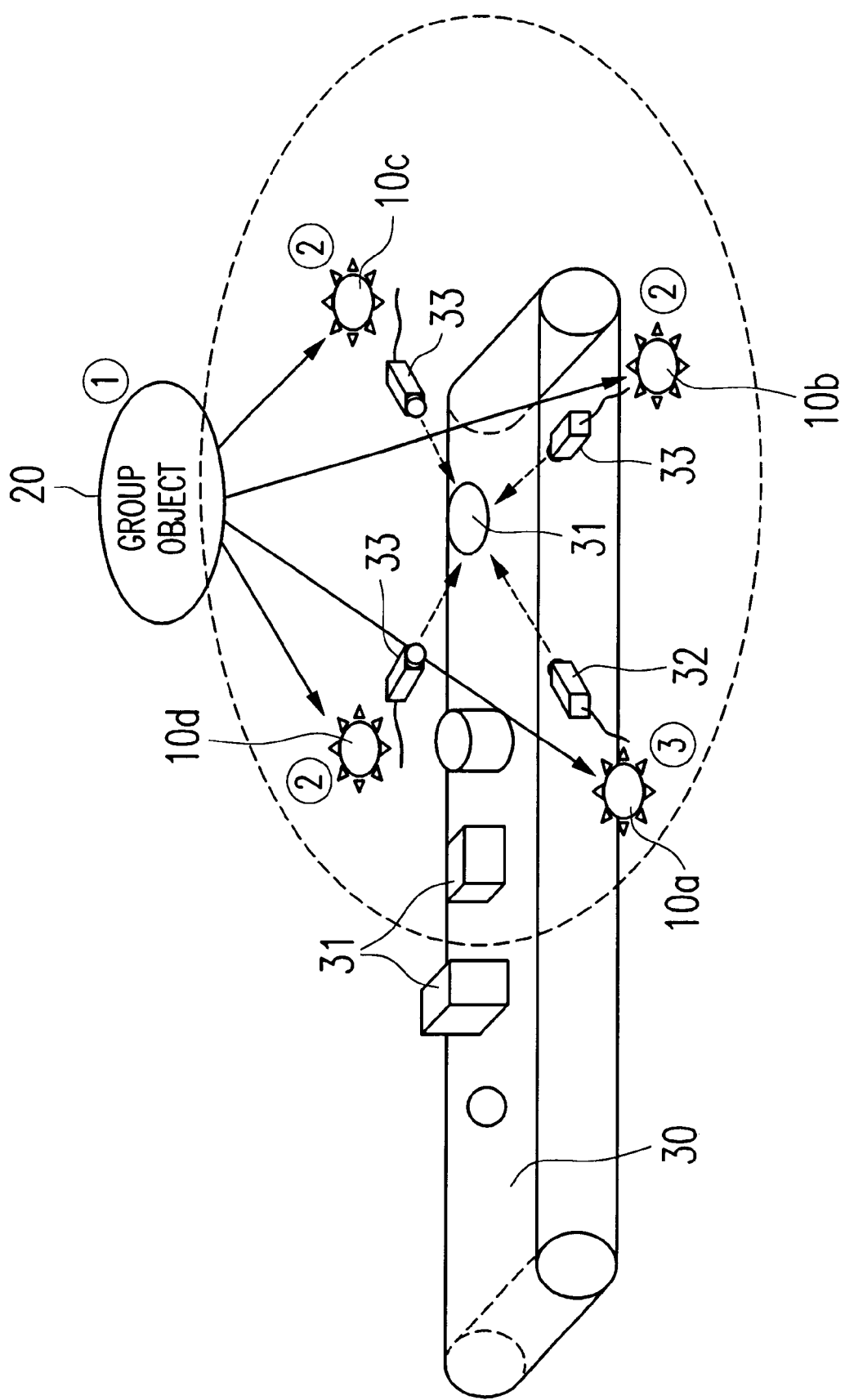
FIG. 17 shows a model for the synchronized control.
Figure 18:
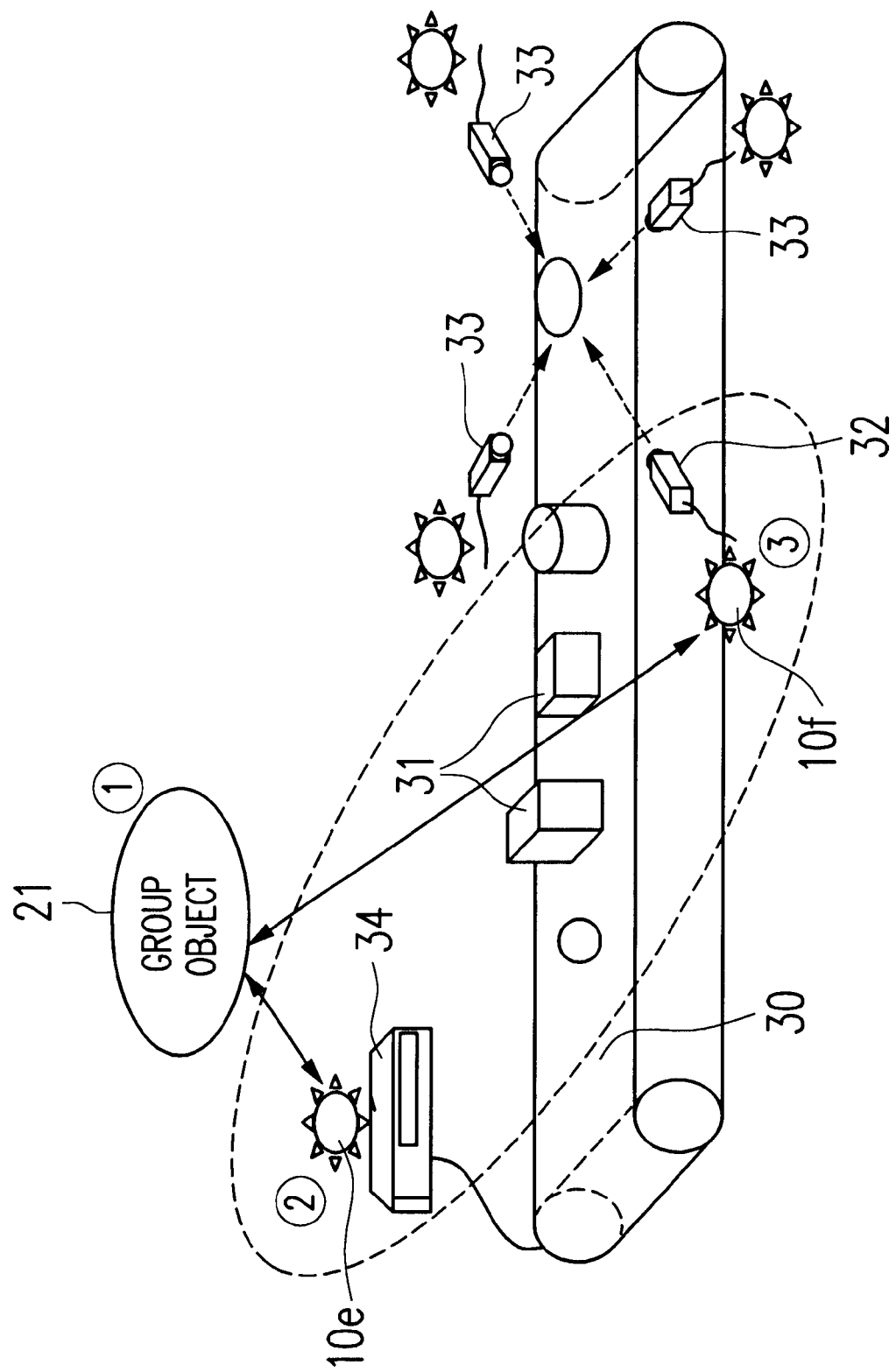
FIG. 18 shows a model for the exclusive control.
Figure 19:
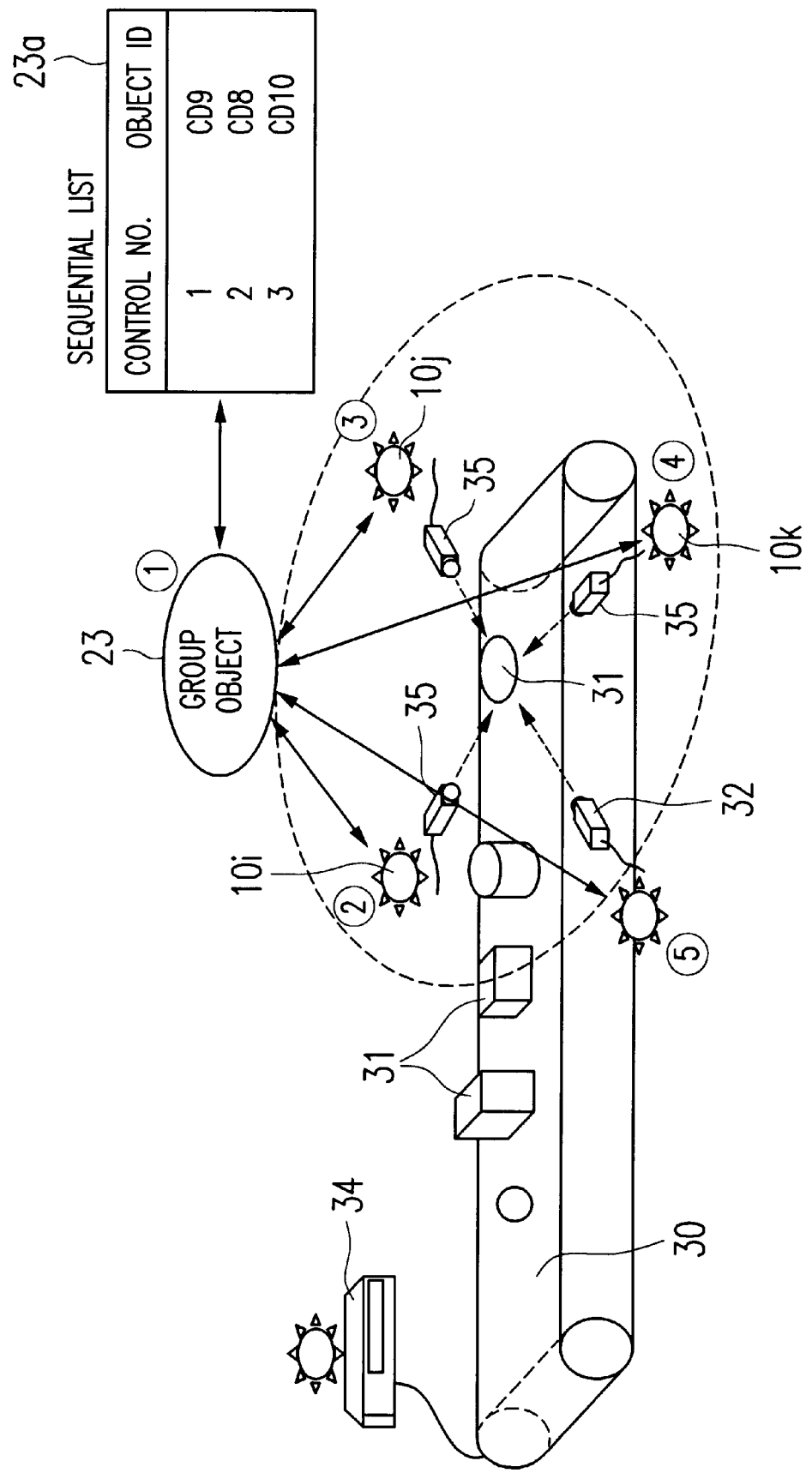
FIG. 19 shows a model for the sequential control.

An actual model with three types of cooperation control are shown in FIGS. 17–19. They are the cooperation controls for the automation production line. FIG. 17 shows a model for the synchronized control. The belt conveyer 10 conveys a plurality of products 31, and the products 31 are visually inspected by the image recognition system. The group object 21 controls the four control devices 10a–10d. One of these control devices is the first control device 10a, and the first control device 10a works for a position sensor 32, and the remaining three control device 10b–10d work for camera units. When the position sensor 32 detects that the product 31 is conveyed to the predetermined position on the belt conveyer, The three camera units take three pictures of the product from three different directions to recognize and inspect the outer images of the product.

In such a configuration, the group object 21 has 8 bits of current event pattern of "00000000". The second through fourth control devices 10b–10d send the Event-wait-Message of "00000001" to the group object 21. Upon the receipt, the group object 21 compares the two event patterns. In this case, the two event patterns "00000000" and "00000001" are not the same, so the information of control device ID (CD2, CD3, CD4) and the event pattern is stored in the event list of the group object 21.

When the position sensor 32 detects the product 31, then the first control device 10a sends the Event-Occurrence-Message to the group object 21. The event pattern in this message is set to "00000001". When the group object 21 receives the message, the event pattern in the event flag of the group object is renewed to "00000001". The group object then compares the event pattern in the event flag with the event patterns in the pattern list. Since they are the same pattern, the group object sends the "Event-Occurrence-Message" to simultaneously activate the three camera units.

FIG. 18 shows a model of the exclusive control. The belt conveyer's control unit 34 is equipped with the control device 10e. The control device 10e sends the Semaphore-Obtaining-Message to the group object 22. When the control device 10e receives the permission of the event, it activates the motor of the conveyer belt 30 for a unit time length (for example, 10 ms). After this, the control device 10e returns the Semaphore-Returning-Message to the group object 22. After this step, the control device 10e sends the Semaphore-Obtaining-Message to the group object 22 again. These steps mentioned above are repeated, and the semaphore counter is then repeatedly set to zero or 1 according to the Semaphore-Obtaining-Message and the Semaphore-Returning-Message unless another control device 10f of the position sensor 32 sends the Semaphore-Obtaining-Message. This repeatedly controls the forward movement of the conveyer.

When the position sensor 32 detects the product 31, and generates the sensing signal to the control device 10f. The control device 10f sends the Semaphore-Obtaining-Message to the group object 22. If the control device 10e is active, the counter value of the group object is zero, and the ID and the semaphore waiting time of the control device 10f is listed in the semaphore list. If the semaphore waiting time is set to the time length which is longer than the unit time length (for example, 10 ms), the Semaphore-Returning-Message is surely returned to the group object. The group object, then, can send the permission of the event after it receives the Semaphore-Returning-Message. These steps can stop the control device 10e and the conveyer is kept to stop.

When the synchronized control is competed for one cycle length, it returns the Semaphore-Returning-Message to the group object 21. According to this synchronized control, the camera unit 33 can take pictures while the product 31 is still, so the clear and high-resolution images are easily obtained. Another advantage of this control is to be able to move the conveyer 30 right after the sensing process is completed.

FIG. 19 shows the sequential control model. When the position sensor 32 detects the product 31 at the position, the three assembling robots 35 start the processing to the product 31 in predetermined order. In this example, three control devices 10i–10l are sequentially controlled by the group object 23. When the group object 23 receives the Sequential-Execution-Message from the position sensor 32, firstly the group object sends the Sequential-Execution-Message to the ninth control device 10j having CD9 according to the order listed in the sequential list 23a. After the predetermined process in the ninth control device 10j, the ninth control device sends the Sequential-Completion-Message to the group object. The group object 23 sends the next Sequential-Execution-Message to the eighth control device 10i which has the smallest control number next to the ninth control device. After the predetermined process in the eighth control device 10i, the group object sends the next Sequential-Execution-Message to the tenth control device 10k. Since the tenth control device 10k is the last device, the group object sends the Sequential-Completion-Message to the position sensor 32 when the group object receives the Sequential-Completion-Message from the tenth control device.

The above model is an assembling line for automobile which is in cooperation control, but this invention is not limited to this field, and can be applied in many kinds of industrial fields.

(Effects of the Invention)

In the control system using the group object, it is relatively easy to perform a maintenance service, and the maintenance can be performed in the real time. This is because this system needs the maintenance work only in the cooperation control group although many other control devices are connected to the network together.

Since each control device sends messages only to the group object, it doe not need to know the status of the other control devices to perform the cooperation control with them. If the system modification is necessary after the system is established, the communication program in the existing control devices does not need to change. This can make the system change easy and quick.

What is claimed is:

1. A group object to synchronously control a plurality of control devices connected to a control network, comprising:

a message transmission means to transmit and receive a message to and from a first plurality of synchronized control devices coupled to a control network, said network coupled to one or more other pluralities of control devices controlled independently of said group object;

an event list storage means to store an event list, said event list including each of said first plurality of synchronized control devices that requested execution of an event;

an event flag to store a specific event to be executed at said first plurality of synchronized control devices; and an event permission issuing means to issue an event permission to allow each of said first plurality of synchronized devices listed in said event list to execute said specific event when said each of said first plurality of synchronized devices request said specific event to be executed.

2. A group object to exclusively control a plurality of control devices connected to a control network, comprising:

a memory means to store a maximum number of control devices to be activated exclusively;

a message issuing means to issue a permission or rejection to each of said control devices that sent an event request, said permission or rejection being determined based on said maximum number stored in said memory means; and a data renewal means to renew said maximum number in said memory means.

3. A group object to sequentially control a plurality of control devices connected to a control network, comprising:

a message transmission means to transmit and receive a message to and from a first plurality of sequential control devices coupled to a control network, said network coupled to one or more other pluralities of control devices controlled independently of said group object;

a sequential list storage means to store a sequential list that defines a sequential order of an event execution executed by said first plurality of sequential control devices; and a determining means to determine a next sequential control device based on said sequential list, and provide permission for execution to said next sequential control device.

4. A control unit provided with a group object to synchronously control a plurality of control devices connected to a control network, comprising:

a message transmission means to transmit and receive a message to and from a first plurality of synchronized control devices coupled to a control network, said network coupled to one or more other pluralities of control devices controlled independently of said group object;

an event list storage means to store an event list, said event list including each of said first plurality of synchronized control devices that requested execution of an event;

an event flag to store a specific event to be executed at said first plurality of synchronized control devices; and an event permission issuing means to issue an event permission to allow each of said first plurality of synchronized devices listed in said event list to execute said specific event when said each of said first plurality of synchronized devices request said specific event to be executed.

5. A control unit provided with a group object to exclusively control a plurality of control devices connected to a control network, comprising:

a memory means to store a maximum number of control devices to be activated exclusively;

a message issuing means to issue a permission or rejection to said each of said control devices that sent an event request, said permission or rejection being determined based on said maximum number stored in said memory means; and a data renewal means to renew said maximum number in said memory means.

6. A control unit provided with a group object to sequentially control a plurality of control devices connected to a control network, comprising:

a message transmission means to transmit and receive a message to and from a first plurality of sequential control devices coupled to a control network, said network coupled to one or more pluralities of control devices controlled independently of said group object;

a sequential list storage means to store a sequential list that defines a sequential order of an event execution executed by said first plurality of sequential control devices; and a determining means to determine a next sequential control device based on said sequential list, and provide permission for execution to said next sequential control device.

7. A group object comprising:

a first and second plurality of control devices connected to a control network;

a data structure to store a maximum number of control devices in the first plurality of control devices to be activated exclusively;

a message issuing processing sequence to issue a permission or rejection to each of said control devices in the first plurality of control devices that sent an event request, said permission or rejection being determined based on said maximum number stored in said data structure; and a data update processing sequence to update said maximum number in said data structure.

* * * * *